(12) United States Patent
Fukayama et al.

(10) Patent No.: US 8,199,277 B2
(45) Date of Patent: Jun. 12, 2012

(54) LIQUID CRYSTAL DISPLAY DEVICE AND MANUFACTURING METHOD THEREOF

(75) Inventors: Norihisa Fukayama, Mobara (JP); Mutsumi Maehara, Mobara (JP)

(73) Assignees: Hitachi Displays, Ltd., Chiba (JP); Panasonic Liquid Crystal Display Co., Ltd., Hyogo-ken (JP)

( * ) Notice: Subject to any disclaimer, the term of this patent is extended or adjusted under 35 U.S.C. 154(b) by 372 days.

(21) Appl. No.: 12/700,753

(22) Filed: Feb. 5, 2010

(65) Prior Publication Data

US 2010/0201906 A1    Aug. 12, 2010

(30) Foreign Application Priority Data

Feb. 10, 2009    (JP) ................................ 2009-028255

(51) Int. Cl.
    *G02F 1/1333*    (2006.01)
(52) U.S. Cl. ....................................................... 349/58
(58) Field of Classification Search ..................... 349/58
    See application file for complete search history.

(56) References Cited

U.S. PATENT DOCUMENTS

| | | | | |
|---|---|---|---|---|
| 7,126,650 | B2 * | 10/2006 | Nagahama | 349/58 |
| 2007/0165152 | A1 * | 7/2007 | Suzuki et al. | 349/58 |
| 2009/0237585 | A1 * | 9/2009 | Kim | 349/58 |

FOREIGN PATENT DOCUMENTS

JP    2008-009010    1/2008

* cited by examiner

*Primary Examiner* — Richard Kim
(74) *Attorney, Agent, or Firm* — Antonelli, Terry, Stout & Kraus, LLP.

(57) ABSTRACT

The liquid crystal display device includes a middle frame fixing a liquid crystal display panel, a lower frame having a first plate portion, and a lower cover having a second plate portion and a housing together with the upper cover. A pitch of first through holes formed in the lower frame and a pitch of second through holes formed in the lower cover differ from each other. By selecting a combination of the first through hole and the second through hole, by aligning the selected first through hole and second through hole, and by inserting an insert into the aligned first through hole and the second through hole, a relative positional relationship between the first through hole and the second through hole is fixed.

4 Claims, 4 Drawing Sheets

LIQUID CRYSTAL DISPLAY DEVICE AND MANUFACTURING METHOD THEREOF

BACKGROUND OF THE INVENTION

1. Field of the Invention

The present invention relates to a liquid crystal display device and a manufacturing method thereof.

2. Background Art

There has been known a liquid crystal display device in which a liquid crystal display panel and a backlight are integrally formed. For example, as a document which discloses such a liquid crystal display device, JP-A-2008-9010 (patent document 1) is known. Such a liquid crystal display device may use pins for performing the positioning between the liquid crystal display panel and other parts. Alternatively, the liquid crystal display device may perform the positioning between the liquid crystal display panel and other parts by making use of an outer shape of a housing.

SUMMARY OF THE INVENTION

In the conventional liquid crystal display device, the positional relationship between the liquid crystal display panel and the pins is fixed or the positional relationship between the liquid crystal display panel and an outer shape of a housing is fixed. Accordingly, there has been a drawback that the positional relationship cannot be adjusted after assembling of the liquid crystal display panel unless the liquid crystal display panel is accurately assembled.

Accordingly, it is an object of the present invention to adjust the positional relationship between a liquid crystal display panel and pins or between the liquid crystal display panel and an outer shape of a housing.

(1) The present invention is directed to a liquid crystal display device which includes: a liquid crystal display panel; a backlight which faces the liquid crystal display panel in an opposed manner; an upper cover which is arranged on a display screen side of the liquid crystal display panel; a middle frame which is arranged between the liquid crystal display panel and the backlight; a lower frame which has a first plate portion for supporting a surface of the backlight opposite to the liquid crystal display panel; and a lower cover which has a second plate portion for supporting the first plate portion of the lower frame, and constitutes a housing together with the upper cover. The lower frame includes a pin which projects in the direction opposite to the backlight and a plurality of first through holes which are formed in the first plate portion. The lower cover includes a hole into which the pin is inserted and a plurality of second through holes which are formed in the second plate portion. A pitch of the plurality of first through holes and a pitch of the plurality of second through holes differ from each other, and an insert is inserted into the first through hole and the second through hole after aligning the first through hole and the second through hole.

(2) The present invention is also directed to a manufacturing method of a liquid crystal display device which includes: a liquid crystal display panel; a backlight which faces the liquid crystal display panel in an opposed manner; an upper cover which is arranged on a display screen side of the liquid crystal display panel; a middle frame which is arranged between the liquid crystal display panel and the backlight; a lower frame which has a first plate portion for supporting a surface of the backlight opposite to the liquid crystal display panel; and a lower cover which has a second plate portion for supporting the first plate portion of the lower frame, and constitutes a housing together with the upper cover, wherein the manufacturing method includes the steps of: forming a pin which projects in the direction opposite to the backlight on the lower frame and forming a plurality of first through holes in the first plate portion; forming a hole which is larger than the pin in the lower cover and forming a plurality of second through holes in the second plate portion; selecting a combination of the first through hole and the second through hole and aligning the selected first through hole and second through hole; and inserting an insert into the aligned first through hole and second through hole thus fixing a relative positional relationship between the lower frame and the lower cover.

(3) The present invention is also directed to a liquid crystal display device which includes: a liquid crystal display panel; a backlight which faces the liquid crystal display panel in an opposed manner; a middle frame which is arranged between the liquid crystal display panel and the backlight and is fixed to the liquid crystal display panel; a lower frame which has a first plate portion for supporting a surface of the backlight opposite to the liquid crystal display panel and is fixed to the middle frame; an upper cover which is arranged on a display screen side of the liquid crystal display panel; and a lower cover which has a second plate portion for supporting the first plate portion of the lower frame, and constitutes a housing together with the upper cover. The lower frame includes a plurality of first through holes formed in the first plate portion. The lower cover includes a plurality of second through holes formed in the second plate portion. A pitch of the plurality of first through holes and a pitch of the plurality of second through holes differ from each other. A combination of the first through hole and the second through hole is selected, the selected first through hole and second through hole are aligned, and an insert is inserted into the aligned through holes thus fixing a relative positional relationship between the first through hole and the second through hole.

(4) The present invention is also directed to a manufacturing method of a liquid crystal display device which includes the steps of: preparing a liquid crystal display panel; a backlight which faces the liquid crystal display panel in an opposed manner; a middle frame which is arranged between the liquid crystal display panel and the backlight and is fixed to the liquid crystal display panel; a lower frame which has a first plate portion for supporting a surface of the backlight opposite to the liquid crystal display panel and a plurality of first through holes formed in the first plate portion, and is fixed to the middle frame; an upper cover which is arranged on a display screen side of the liquid crystal display panel; and a lower cover which has a second plate portion for supporting the first plate portion of the lower frame in a slidable manner and a plurality of second through holes which are formed in the second plate portion at a pitch different from a pitch of the plurality of first through holes, and constitutes a housing together with the upper cover; and adjusting a relative positional relationship between the liquid crystal display panel and the housing by selecting a combination of one of the first through holes and one of the second through holes, aligning the selected one first through hole and one second through hole with each other, and inserting an insert into the aligned one first through hole and one second through hole thus fixing a relative positional relationship between one first through hole and one second through hole and adjusting a relative positional relationship between the lower frame and the lower cover due to the combination of the through holes.

DESCRIPTION OF THE PREFERRED EMBODIMENT

Hereinafter, embodiments of the present invention are explained in conjunction with drawings.

First Embodiment

Figure 1:
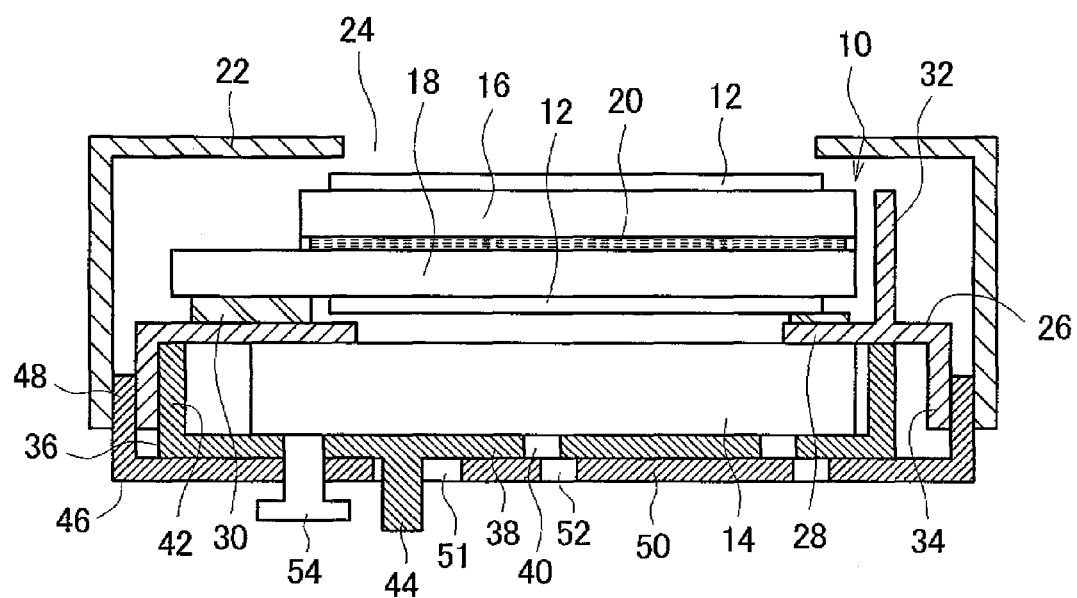
FIG. 1 is a cross-sectional view showing a liquid crystal display device according to a first embodiment of the present invention.

FIG. 1 is a cross-sectional view of a liquid crystal display device according to a first embodiment of the present invention.

The liquid crystal display device according to this embodiment includes: a liquid crystal display panel; a backlight which faces the liquid crystal display panel in an opposed manner, an upper cover which is arranged on a display screen side of the liquid crystal display panel; a middle frame which is arranged between the liquid crystal display panel and the backlight and is fixed to the liquid crystal display panel and the upper cover; a lower frame which has a first plate portion for supporting a surface of the backlight opposite to the liquid crystal display panel; and a lower cover which has a second plate portion for supporting the first plate portion of the lower frame in a slidable manner and constitutes a housing together with the upper cover. The lower frame includes a pin which projects in the direction opposite to the backlight, and a plurality of first through holes which are formed in the first plate portion. The lower cover includes a hole which has an outer shape larger than an outer shape of the pin so as to allow the insertion of the pin therein and a plurality of second through holes which are formed in the second plate portion. A pitch of the plurality of first through holes and a pitch of the plurality of second through holes differ from each other. A combination of one first through hole and one second through hole is selected, the selected first through hole and second through hole are aligned with each other, and an insert is inserted into the respective through holes and hence, a relative positional relationship between one first through hole and one second trough hole is fixed. Due to such a combination, a relative positional relationship between the lower frame and the lower cover can be adjusted thus adjusting a relative positional relationship between the pin and the lower cover. According to the present invention, the liquid crystal display panel is fixed to the upper cover using the middle frame and hence, it is possible to adjust a relative positional relationship between the liquid crystal display panel and the pin by moving the lower frame on which the pin is formed.

Further, a manufacturing method of a liquid crystal display device according to this embodiment includes the steps of: preparing a liquid crystal display panel; a backlight which faces the liquid crystal display panel in an opposed manner; an upper cover which is arranged on a display screen side of the liquid crystal display panel; a middle frame which is arranged between the liquid crystal display panel and the backlight and is fixed to the liquid crystal display panel and the upper cover; a lower frame which has a first plate portion for supporting a surface of the backlight opposite to the liquid crystal display panel, a pin which projects in the direction opposite to the backlight, and a plurality of first through holes formed in the first plate portion; and a lower cover which has a second plate portion for supporting the first plate portion of the lower frame in a slidable manner, a hole which is larger than an outer shape of the pin, and a plurality of second through holes which are formed in the second plate portion at a pitch different from a pitch of the plurality of first through holes, and constitutes a housing together with the upper cover; and adjusting a relative positional relationship between the pin and the lower cover by selecting a combination of one first through hole and one second through hole, aligning the selected one first through hole and one second through hole, inserting an insert into the aligned one first through hole and one second through hole thus fixing a relative positional relationship between one first through hole and one second through hole and adjusting a relative positional relationship between the lower frame and the lower cover due to the combination of the through holes. According to the present invention, the liquid crystal display panel is fixed to the upper cover using the middle frame and hence, it is possible to adjust a relative positional relationship between the liquid crystal display panel and the pin by moving the lower frame on which the pin is formed.

The liquid crystal display device includes a liquid crystal display panel 10. A polarizer 12 is arranged on both surfaces of the liquid crystal display panel 10 respectively. The liquid crystal display device includes a backlight 14 which faces the liquid crystal display panel 10 in an opposed manner. The liquid crystal display panel 10 and the backlight 14 are not fixed to each other so that these parts are movable (for example, slidable along opposing surfaces) relatively to each other. One polarizer 12 is interposed between the liquid crystal display panel 10 and the backlight 14. A flexible printed circuit board not shown in the drawing is mounted on the liquid crystal display panel 10.

The liquid crystal display panel 10 includes a pair of substrates 16, 18 which face each other in an opposed manner. One substrate 16 is a color filter substrate which includes a black matrix and colored layers of plural colors not shown in the drawing, and the other substrate 18 is a TFT substrate (or an array substrate) which includes TFTs (Thin Film Transistors), pixel electrodes not shown in the drawing and the like. Liquid crystal 20 is sandwiched between the pair of substrates 16, 18.

The liquid crystal display device includes an upper cover 22 which is arranged on a display-screen side of the liquid crystal display panel 10. The upper cover 22 includes a light transmitting region 24 above a display screen of the liquid crystal display panel 10. The light transmitting region 24 may be an opening as shown in FIG. 1 or may be a portion made of a light transmitting material. The upper cover 22 is formed in a shape which allows the upper cover 22 to cover the liquid crystal display panel 10 from above, and includes a side portion.

The liquid crystal display device includes a middle frame 26. The middle frame 26 includes a support portion 28 which is arranged between the liquid crystal display panel 10 and the backlight 14, and the support portion 28 is fixed to the liquid crystal display panel 10. The support frame 28 is fixed by an adhesion using an adhesive tape 30. The middle frame 26 includes a wall portion 32 on a side of the liquid crystal display panel 10, and the wall portion 32 is used for the positioning of the liquid crystal display panel 10 in mounting the liquid crystal display panel 10. The middle frame 26 includes a fixing portion 34 which is used for fixing the middle frame 26 to the upper cover 22. The fixing portion 34 is formed such that the fixing portion 34 extends downward in the direction opposite to the wall portion 32. The middle frame 26 is fixed to the upper cover 22 by way of a portion (mounting portion 48) of a lower frame 46. The fixing portion 34 is fixed to the mounting portion 48 of the lower cover 46 by a pressure contact.

The liquid crystal display device includes the lower frame 36. The lower frame 36 includes a first plate portion 38 which supports a surface of the backlight 14 opposite to the liquid crystal display panel 10. A plurality of first through holes 40 are formed in the first plate portion 38. The first plate portion 38 includes a partition wall portion 42, and the backlight 14 is arranged inside the partition wall portion 42. A pair of portions of the partition wall portion 42 which face each other in an opposed manner (portions of the partition wall portion 42 positioned on both sides of the backlight 14) is arranged inside a pair of portions of the fixing portion 34 of the middle frame 26 which face each other in an opposed manner (portions of the middle frame 26 which are brought into pressure contact with the mounting portion 48 of the lower cover 46) with a gap therebetween. Accordingly, the lower frame 36 is movable inside the pair of portions of the fixing portion 34 of the middle frame 26 which face each other in an opposed manner.

By interposing the partition wall portion 42 between the first plate portion 38 and the support portion 28 of the middle frame 26 as a spacer, it is possible to ensure a housing space for the backlight 14 between the first plate portion 38 and the support portion 28. Although the backlight 14 is not fixed to the first plate portion 38, the backlight 14 is housed inside the partition wall portion 42. The lower frame 36 includes a pin 44 which projects in the direction opposite to the backlight 14. The pin 44 is formed on the first plate portion 38.

The liquid crystal display device includes the lower cover 46. The lower cover 46 constitutes the housing together with the upper cover 22. The lower cover 46 includes a mounting portion 48 for mounting the lower cover 46 on the upper cover 22. The mounting portion 48 is sandwiched between the fixing portion 34 of the middle frame 26 and the upper cover 22 and hence, the lower cover 46 is mounted on the upper cover 22.

The lower cover 46 includes a second plate portion 50 which supports the first plate portion 38 of the lower frame 36 in a slidable manner. The lower cover 46 includes a hole 51 which is larger than an outer shape of the pin 44 so as to allow the insertion of the pin 44 into the hole 51. The hole 51 is formed in the second plate portion 50. A plurality of second through holes 52 are also formed in the second plate portion 50.

One first through hole 40 and one second through hole 52 are aligned with each other, and an insert 54 is inserted into these holes 40, 52. Due to the insertion of the insert 54, a relative positional relationship between one first through hole 40 and one second through hole 52 can be fixed. The insert 54 may be inserted into the holes by press-fitting or may be fixed using a screw.

Figure 2:
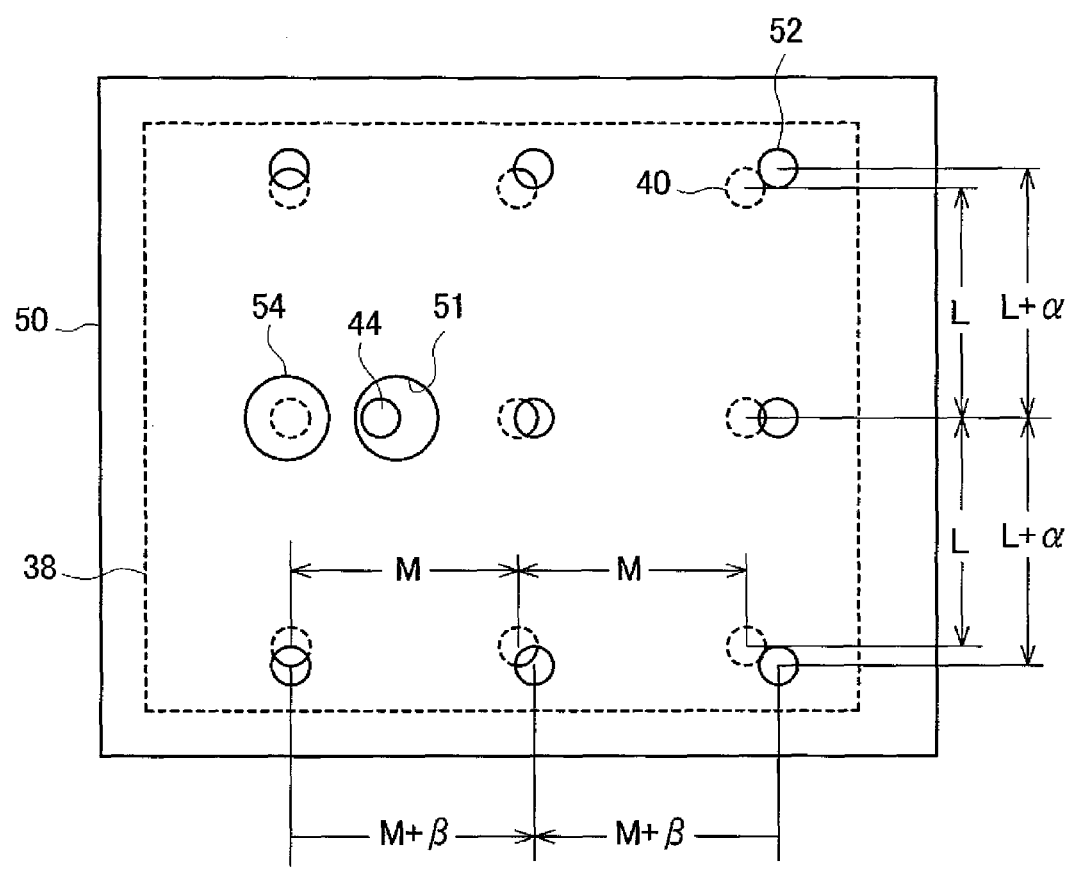
FIG. 2 is a plan view showing a first plate portion and a second plate portion of the liquid crystal display device.

FIG. 2 is a plan view showing the first plate portion 38 and the second plate portion 50. While a longitudinal pitch of the plurality of first through holes 40 formed in the first plate portion 38 is set to L, a longitudinal pitch of the plurality of second through holes 52 formed in the second plate portion 50 is set to L+α. Here, α may take a negative value.

In the same manner as the longitudinal pitches, while a lateral pitch of the plurality of first through holes 40 formed in the first plate portion 38 is set to M, a lateral pitch of the plurality of second through holes 52 formed in the second plate portion 50 is set to M+β. Here, β may take a negative value. As described above, the pitches of the plurality of first through holes 40 and the pitches of the plurality of second through holes 52 differ from each other. Accordingly, depending on the combination of one first through hole 40 and one second through hole 52, relative positions of the lower frame 36 and the lower cover 46 are displaced.

Figure 3:
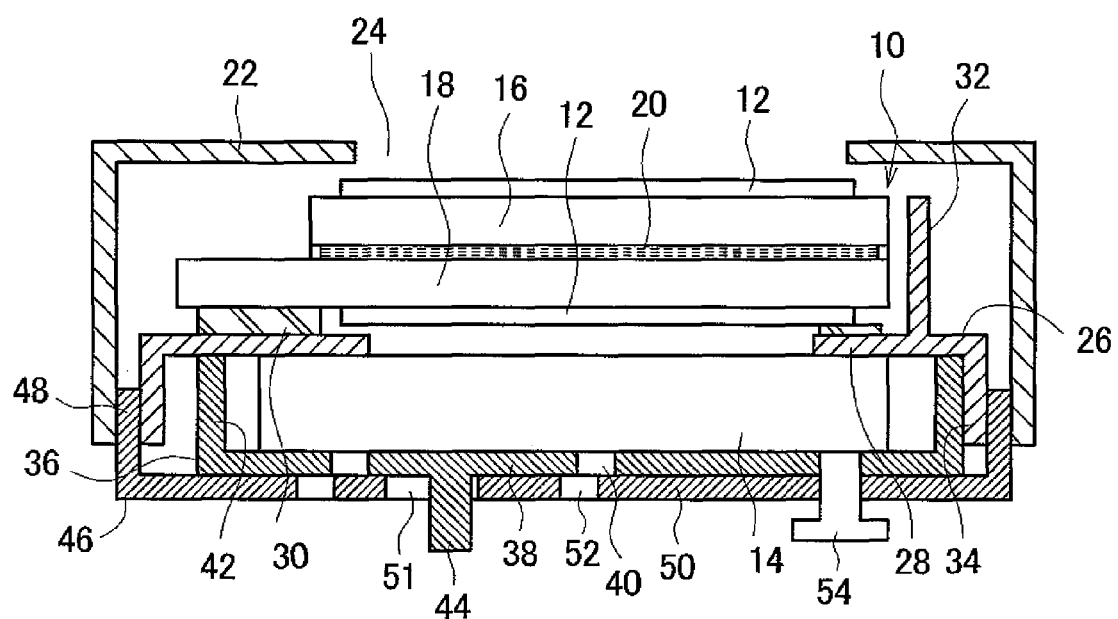
FIG. 3 is a view for explaining an adjustment of a position of a pin relative to a liquid crystal display panel.

FIG. 3 is a view for explaining the adjustment of a position of the pin 44 relative to the liquid crystal display panel 10. As can be clearly understood from the comparison of FIG. 1 and FIG. 3, depending on the combination of one first through hole 40 and one second through hole 52, it is possible to adjust a relative positional relationship between the lower frame 36 and the lower cover 46. To be in more detail, in FIG. 3, one combination of through holes which is displaced by two combinations rightward from one combination of through holes on the left side selected in FIG. 1 is selected and hence, the lower frame 36 is displaced rightward by a size of 2β (see FIG. 2). Accordingly, the pin 44 is also moved by the same amount. Due to such an operation, it is possible to adjust the relative positional relationship between the pin 44 and the lower cover 46.

Here, as shown in FIG. 2, a pitch of the plurality of first through holes 40 and a pitch of the plurality of the second through holes 52 differ from each other also in the longitudinal direction as shown in FIG. 2. Accordingly, in the example shown in FIG. 1 and FIG. 3, the relative positional relationship between the pin 44 and the lower cover 46 can also be adjusted in the direction from a front side to a depth side of the drawing and the opposite direction.

According to this embodiment, it is possible to adjust the relative positional relationship between the liquid crystal display panel 10 and the pin 44 by moving the lower frame 36 on which the pin 44 is formed.

In the manufacturing method of the liquid crystal display device, the liquid crystal display panel 10, the backlight 14, the upper cover 22, the middle frame 26, the lower frame 36, and the lower cover 46 are prepared. The detailed structure and functions of these parts have been explained heretofore.

In assembling these parts, the liquid crystal display panel 10 is arranged along the wall portion 32, and is fixed to the middle frame 26 (support portion 28) using the adhesive tape 30. The backlight 14 and the lower frame 36 are arranged between the middle frame 26 and the lower cover 46, and the lower cover 46 is mounted on the middle frame 26. Then, one combination of the first through hole 40 and the second through hole 52 which bring the position of the pin 44 closest to the optimum position is selected, and the insert 54 is inserted into the through holes 40, 52. Due to such an operation, it is possible to adjust the relative positional relationship between the liquid crystal display panel 10 and the pin 44. Then, the upper cover 22 is mounted on the lower cover 46. Other processes include a method which is self-explanatory from the above-mentioned constitution and also include a known manufacturing method of a liquid crystal display device.

Second Embodiment

Figure 4:
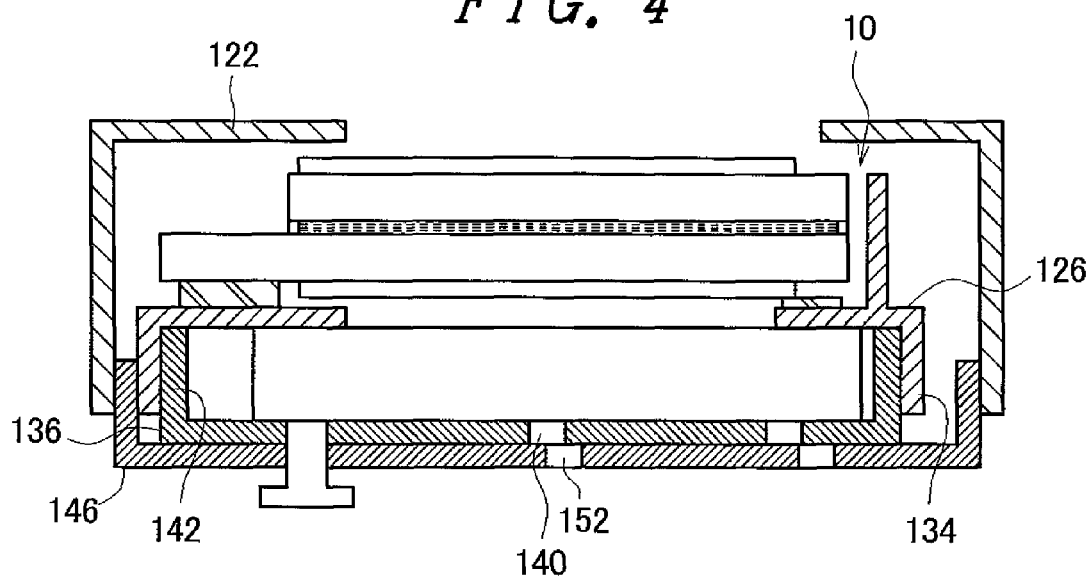
FIG. 4 is a cross-sectional view showing a liquid crystal display device according to a second embodiment of the present invention.

FIG. 4 is a cross-sectional view showing a liquid crystal display device according to a second embodiment of the present invention.

The liquid crystal display device according to this embodiment includes: a liquid crystal display panel; a backlight which faces the liquid crystal display panel in an opposed manner; a middle frame which is arranged between the liquid crystal display panel and the backlight and is fixed to the liquid crystal display panel; a lower frame which has a first plate portion for supporting a surface of the backlight opposite to the liquid crystal display panel and is fixed to the middle frame; an upper cover which is arranged on a display screen side of the liquid crystal display panel; and a lower cover which has a second plate portion for supporting the first plate portion of the lower frame in a slidable manner, and constitutes a housing together with the upper cover.

The lower frame includes a plurality of first through holes which are formed in the first plate portion. The lower cover includes a plurality of second through holes which are formed in the second plate portion. A pitch of the plurality of first through holes and a pitch of the plurality of second through holes differ from each other. A combination of one first through hole and one second through hole is selected, the selected one first through hole and one second through hole are aligned, and an insert is inserted into the aligned through holes thus fixing a relative positional relationship between one first through hole and one second through hole. Accordingly, due to the combination of the through holes, a relative positional relationship between the lower frame and the lower cover is adjusted and hence, it is possible to adjust a relative positional relationship between the liquid crystal display panel and the housing.

According to the present invention, the liquid crystal display panel is fixed to the lower frame using the middle frame and hence, it is possible to adjust the relative positional relationship between the liquid crystal display panel and the housing by moving the lower frame.

Further, a manufacturing method of the liquid crystal display device according to this embodiment includes the steps of: preparing the liquid crystal display panel; the backlight which faces the liquid crystal display panel in an opposed manner; the middle frame which is arranged between the liquid crystal display panel and the backlight and is fixed to the liquid crystal display panel; a lower frame which has a first plate portion for supporting a surface of the backlight opposite to the liquid crystal display panel and the plurality of first through holes formed in the first plate portion, and is fixed to the middle frame; the upper cover which is arranged on a display screen side of the liquid crystal display panel; and the lower cover which has the second plate portion for slidably supporting the first plate portion of the lower frame and a plurality of second through holes which are formed in the second plate portion at a pitch different from a pitch of the plurality of first through holes and constitutes the housing together with the upper cover; and adjusting a relative positional relationship between the liquid crystal display panel and the housing by selecting a combination of one of the first through holes and one of the second through holes, aligning the selected one first through hole and one second through hole with each other, and inserting the insert into the aligned one first through hole and one second through hole thus fixing the relative positional relationship between one first through hole and one second through hole and adjusting a relative positional relationship between the lower frame and the lower cover due to the combination.

According to the present invention, the liquid crystal display panel is fixed to the lower frame using the middle frame and hence, it is possible to adjust the relative positional relationship between the liquid crystal display panel and the housing by moving the lower frame.

In this embodiment, the middle frame 126 is not fixed to the upper cover 122, and the middle frame 126 is movable inside the housing (upper cover 122 and lower cover 146). Further, the lower frame 136 is fixed to the middle frame 126. To be in more detail, a partition wall portion 142 of the lower frame 136 is fixed to an inner side of a fixing portion 134 of the middle frame 126. Further, a pin is not formed on the lower frame 136, and the lower cover 146 has no hole into which the pin is inserted.

The constitutions other than the above-mentioned constitution correspond to the constitutions explained in conjunction with the first embodiment.

According to this embodiment, it is possible to adjust the relative positional relationship between the lower frame 136 and the lower cover 146 due to the combination of one first through hole 140 and one second through hole 152. Accordingly, it is possible to adjust the relative positional relationship between the liquid crystal display panel 10 and the housing.

Figure 5:
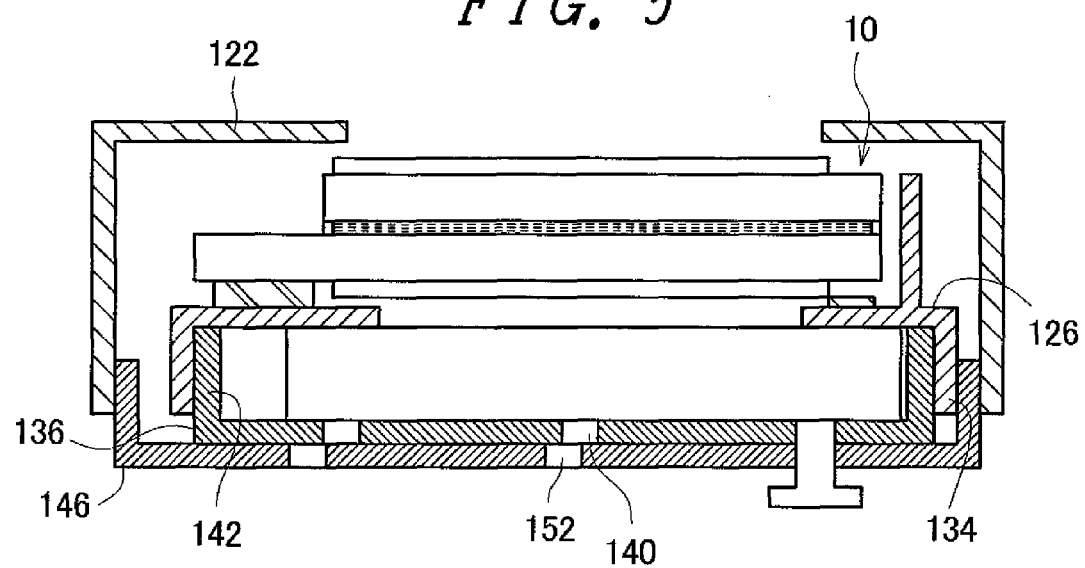
FIG. 5 is a view for explaining an adjustment of a position of the liquid crystal display panel relative to a housing.

FIG. 5 is a view for explaining the adjustment of a position of the liquid crystal display panel 10 relative to the housing. As can be clearly understood from the comparison of FIG. 4 and FIG. 5, due to the combination of one first through hole 140 and one second through hole 152, it is possible to adjust the relative positional relationship between the lower frame 136 and the lower cover 146. To be in more detail, in FIG. 5, one combination of through holes which is displaced rightward from one combination of through holes on the left side selected in FIG. 4 by two combinations of through holes is selected. Accordingly, the lower frame 136 is displaced rightward by a predetermined size. Accordingly, the middle frame 126 which is fixed to the lower frame 136 is also moved by the same size and hence, the liquid crystal display panel 10 which is fixed to the middle frame 126 is also moved by the same size. Due to such a movement, it is possible to adjust a relative positional relationship between the lower cover 146 and the liquid crystal display panel 10 and hence, it is possible to adjust the relative positional relationship between an outer shape of the housing which is constituted of the lower cover 146 and the upper cover 122 and the liquid crystal display panel 10.

The manufacturing method of the liquid crystal display device according to this embodiment includes a content which is self-explanatory from the above-mentioned constitution. The detail of the manufacturing method of this embodiment is the same as the detail of the manufacturing method explained in conjunction with the first embodiment. The above-mentioned manufacturing method further includes a known manufacturing method of a liquid crystal display device.

The present invention is not limited to the above-mentioned embodiments and various modifications are conceivable. For example, the constitution explained in conjunction with the above-mentioned embodiments may be replaced with the constitution which is substantially equal to the above-mentioned constitution, the constitution which can obtain the same manner of operation and advantageous effects as the above-mentioned constitution, or the constitution which can achieve the same object as the above-mentioned constitution.

What is claimed is:
1. A liquid crystal display device comprising:
a liquid crystal display panel;
a backlight which faces the liquid crystal display panel in an opposed manner;
an upper cover which is arranged on a display screen side of the liquid crystal display panel;
a middle frame which is arranged between the liquid crystal display panel and the backlight;
a lower frame which has a first plate portion for supporting a surface of the backlight opposite to the liquid crystal display panel; and a lower cover which has a second plate portion for supporting the first plate portion of the lower frame, and constitutes a housing together with the upper cover, wherein the lower frame includes a pin which projects in the direction opposite to the backlight and a plurality of first through holes which are formed in the first plate portion, the lower cover includes a hole into which the pin is inserted and a plurality of second through holes which are formed in the second plate portion, a pitch of the plurality of first through holes and a pitch of the plurality of second through holes differ from each other, and an insert is inserted into the first through hole and the second through hole after aligning the first through hole and the second through hole.

2. A manufacturing method of a liquid crystal display device which includes: a liquid crystal display panel; a backlight which faces the liquid crystal display panel in an opposed manner; an upper cover which is arranged on a display screen side of the liquid crystal display panel; a middle frame which is arranged between the liquid crystal display panel and the backlight; a lower frame which has a first plate portion for supporting a surface of the backlight opposite to the liquid crystal display panel; and a lower cover which has a second plate portion for supporting the first plate portion of the lower frame, and constitutes a housing together with the upper cover, the manufacturing method comprising the steps of:

forming a pin which projects in the direction opposite to the backlight on the lower frame and forming a plurality of first through holes in the first plate portion;

forming a hole which is larger than the pin in the lower cover and forming a plurality of second through holes in the second plate portion;

selecting a combination of the first through hole and the second through hole and aligning the selected first through hole and second through hole; and inserting an insert into the aligned first through hole and second through hole thus fixing a relative positional relationship between the lower frame and the lower cover.

3. A liquid crystal display device comprising:

a liquid crystal display panel;

a backlight which faces the liquid crystal display panel in an opposed manner;

a middle frame which is arranged between the liquid crystal display panel and the backlight and is fixed to the liquid crystal display panel;

a lower frame which has a first plate portion for supporting a surface of the backlight opposite to the liquid crystal display panel and is fixed to the middle frame;

an upper cover which is arranged on a display screen side of the liquid crystal display panel; and a lower cover which has a second plate portion for supporting the first plate portion of the lower frame, and constitutes a housing together with the upper cover, wherein the lower frame includes a plurality of first through holes formed in the first plate portion, the lower cover includes a plurality of second through holes formed in the second plate portion, a pitch of the plurality of first through holes and a pitch of the plurality of second through holes differ from each other, and a combination of the first through hole and the second through hole is selected, the selected first through hole and second through hole are aligned with each other, and an insert is inserted into the aligned through holes thus fixing a relative positional relationship between the first through hole and the second through hole.

4. A manufacturing method of a liquid crystal display device which includes: a liquid crystal display panel; a backlight which faces the liquid crystal display panel in an opposed manner; a middle frame which is arranged between the liquid crystal display panel and the backlight and is fixed to the liquid crystal display panel; a lower frame which has a first plate portion for supporting a surface of the backlight opposite to the liquid crystal display panel and a plurality of first through holes formed in the first plate portion, and is fixed to the middle frame; an upper cover which is arranged on a display screen side of the liquid crystal display panel; and a lower cover which has a second plate portion for supporting the first plate portion of the lower frame and a plurality of second through holes which are formed in the second plate portion at a pitch different from a pitch of the plurality of first through holes, and constitutes a housing together with the upper cover, the manufacturing method comprising the steps of:

selecting a combination of the first through hole and the second through hole and aligning the selected first through hole and second through hole; and inserting an insert into the aligned first through hole and second through hole thus fixing a relative positional relationship between the first through hole and the second through hole.

\* \* \* \* \*